Oct. 4, 1949.  J. J. EBENHOE  2,483,762
MOWER FOR USE ON HILLS
Filed April 2, 1948  3 Sheets-Sheet 1
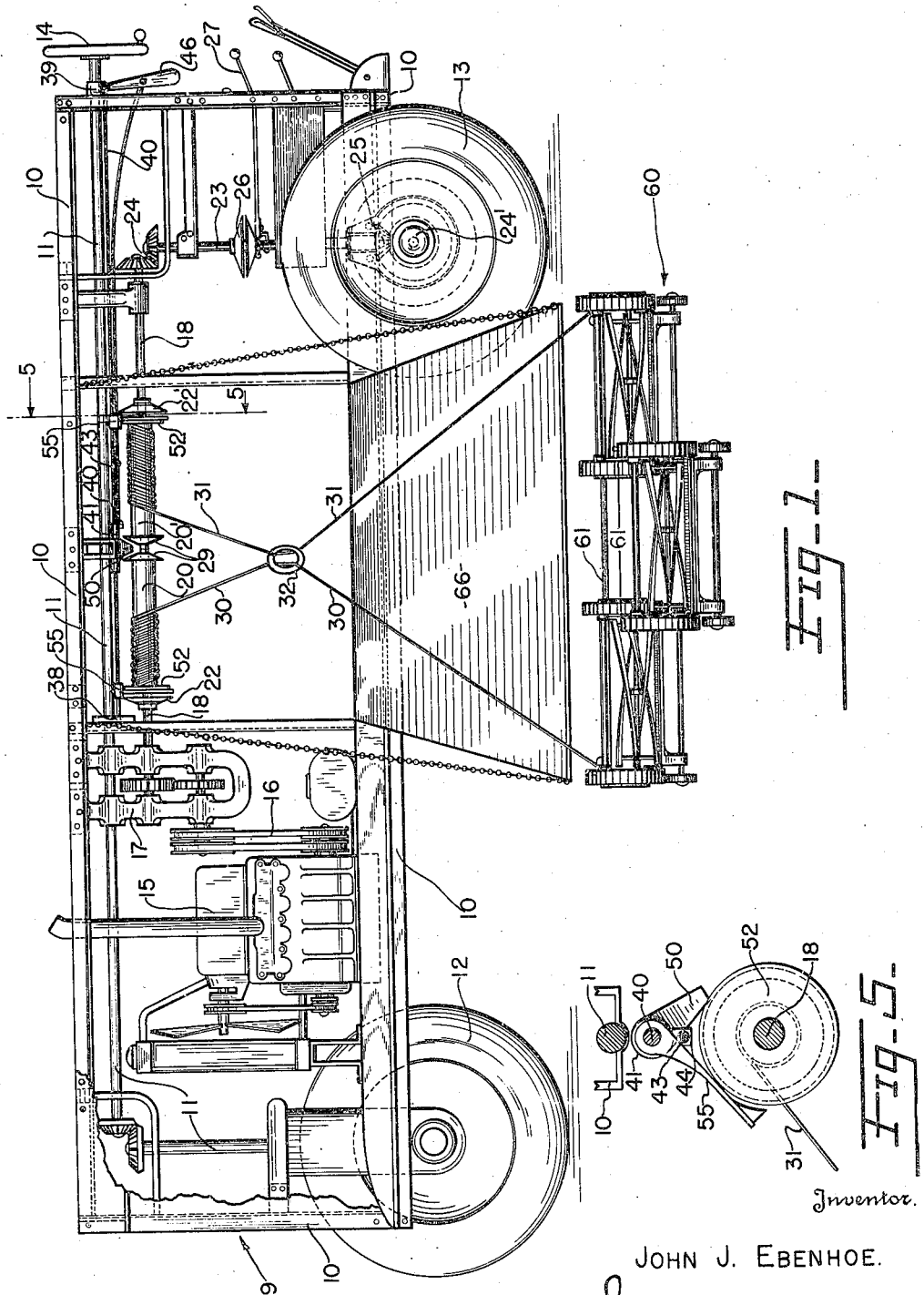
Inventor.
JOHN J. EBENHOE.
By
Attorneys.

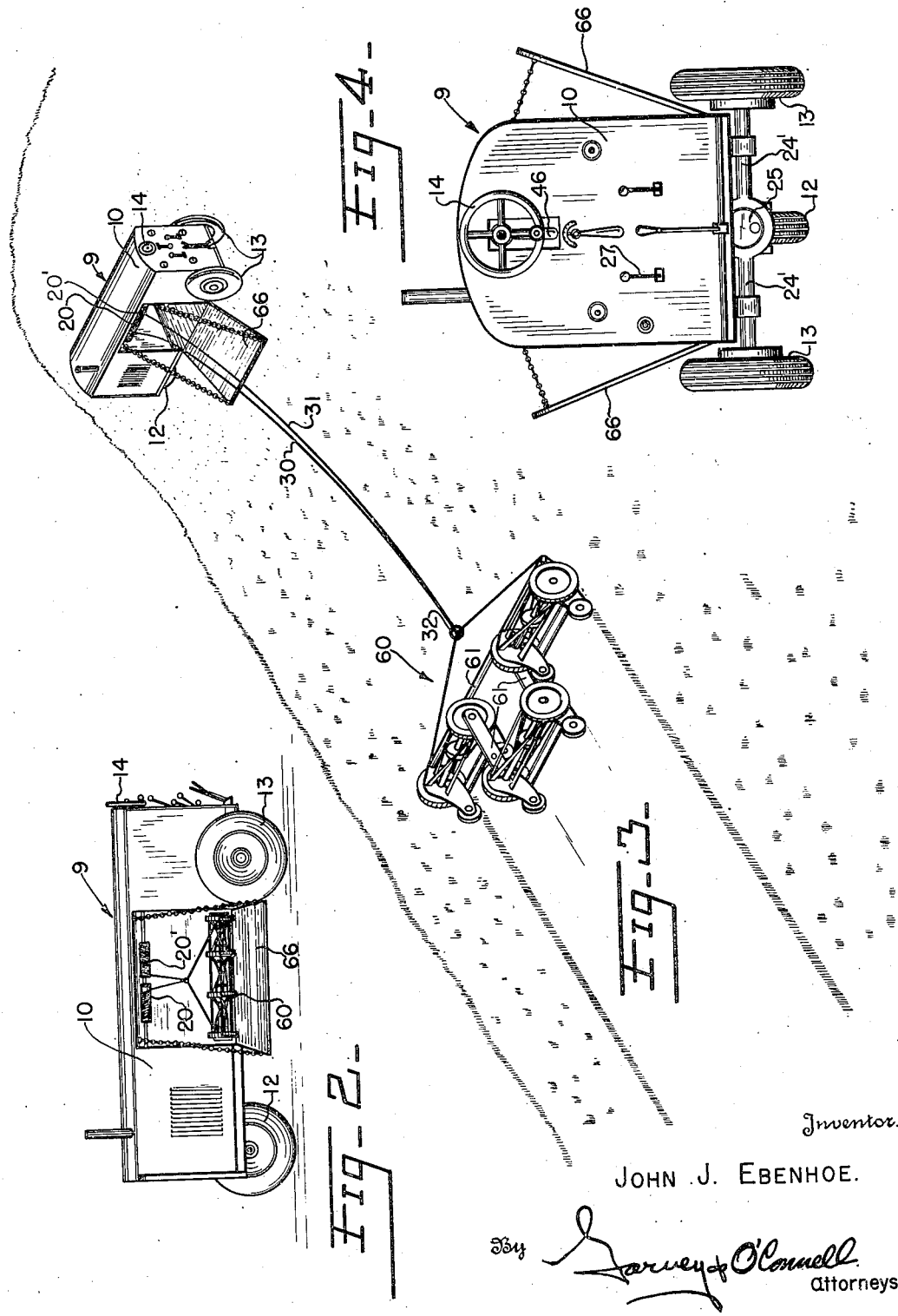

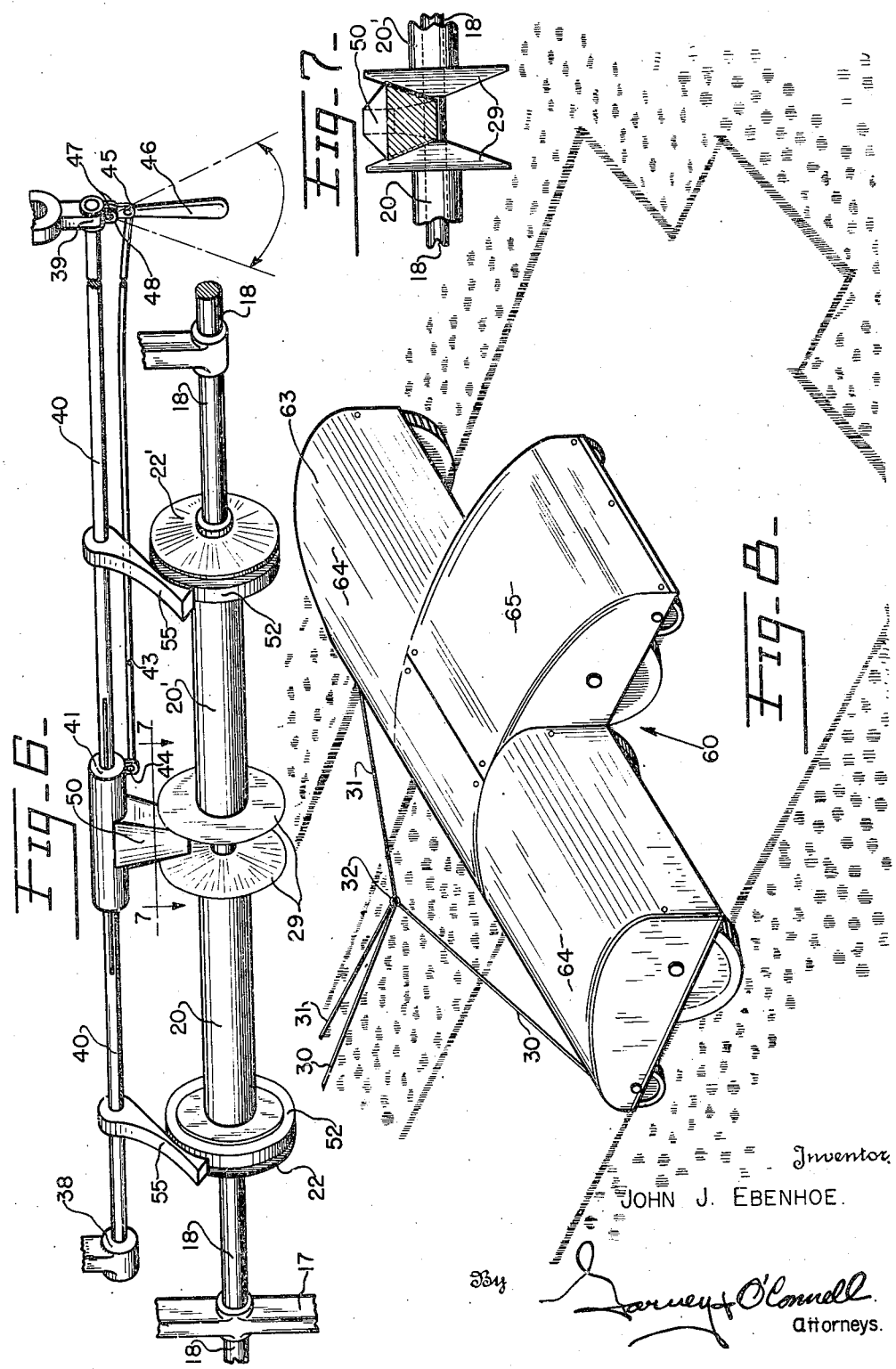

Patented Oct. 4, 1949

2,483,762

UNITED STATES PATENT OFFICE 2,483,762

MOWER FOR USE ON HILLS

John J. Ebenhoe, Manitowoc, Wis.

Application April 2, 1948, Serial No. 18,665

3 Claims. (Cl. 56—7)

1

This invention relates to a mower for use on hills and more particularly to a mower including a mobile powered winch and a captive wheeled cutter payed out down the hill from the winch and drawn back to the winch.

The mowing of grass and weeds on a hill presents a difficult and time-consuming task. It is customary to employ at least two men on a hand-type grass cutter, one man on the handle and another man on a rope tied to the front of the cutter. Mowing a hill in this manner is very slow and very fatiguing. It is therefore a general object of this invention to provide a powered mowing device for use on hills which may be operated by one man at a great saving in labor cost.

It is another object to provide a mower that may mow as a cutter rolls downhill and also as the cutter is drawn uphill.

It is a further object to provide a mower having a captive cutter which may be easily controlled from the top of the hill by one man.

In pursuance of these and other objects that will be apparent to those skilled in the art, I provide a mobile powered winch having two drums and a cable on each drum. The free ends of the cables are connected to a captive grass cutter, one to each side thereof. The drums of the winch are mounted above a chamber on the mobile platform having a ramp leading therefrom to the ground. The captive grass cutter is stored in the chamber when not in use and may be rolled therefrom down the ramp and down the hill. Clutch or brake means related with the two drums are provided to control the direction the grass cutter takes on its way down the hill. The drums are engaged with the power unit to pull the cutter up the hill. The cutter may be arranged to cut both when rolling down the hill and when drawn up the hill. I also provide clutch means for engaging the wheels of the mobile winch with the power unit for moving the winch into position for the next cut.

Referring briefly to the drawings wherein I show presently preferred embodiments of the invention:

Figure 1 is a side elevational view of the invention with the side panels of the mobile truck cut away to show the mechanism therein. A grass cutter is shown in the foreground connected by cables with the winch in the truck;

Figure 2 is a side elevational view of the invention showing the grass cutter withdrawn into the chamber in the truck;

2

Figure 3 is a perspective view illustrating the use of the invention to cut grass on a hill;

Figure 4 is a rear elevational view of the invention showing the control handles thereon;

Figure 5 is a detail sectional view taken on the line 5—5 of Figure 1 looking in the direction of the arrows illustrating the clutch and brake mechanism;

Figure 6 is a perspective view of the winch drums and clutch and brake mechanism removed from the interior of the truck;

Figure 7 is a sectional view taken on the line 7—7 of Figure 6, and

Figure 8 is a perspective view of another form of grass cutter that may be used with the winch truck, the form here illustrated being adapted to cut grass both when going downhill and when going uphill.

Referring now in greater detail to the drawings, a truck generally designated 9 includes a body 10 mounted on one front wheel 12 and two rear wheels 13. The front wheel 12 is steered by a steering gear 11 controlled by a steering wheel 14. A power unit 15 mounted in the body may be a three-horsepower gasoline motor. Power is transmitted through a double V-belt drive 16, a gear box 17 to a drum shaft 18. Two winch drums 20 and 20' are mounted on drum shaft 18 so as to be freely revolvable and axially slidable thereon. Clutch faces 22 and 22' are rigidly fixed to drum shaft 18 beside the drums 20 and 20'. The other end of drum shaft 18 is engaged with a vertical drive shaft 23 by means of a pair of bevel gears 24. Drive shaft 23 is engaged at its lower end with the rear axle 24' through a bevel gear and ring gear assembly 25. The drive shaft 23 is interrupted and equipped with a conventional clutch 26 which is engaged and disengaged by means of drive clutch lever 27 in a conventional manner.

The inner ends of drums 20 and 20' are provided with cone-shaped bearing surfaces 29. Drums 20 and 20' have wound thereon cables 30 and 31 respectively fixed at one end to the drum and extending therefrom to a ring 32. The ring 32 is fixed to one of the cables 30 and is slidably engaged with the other cable 31.

A clutch shaft 40 is journaled at 38 and 39 on the body 10 of the truck 9. A cylindrical member 41 is splined on the shaft 40, as shown to advantage in Figure 6, so that the cylindrical member 41 is free to reciprocate on the shaft 40 but is prevented from rotation thereon. A control rod 43 is pivotally connected at 44 to the cylindrical member 41 and the other end of the control rod is pivotally connected at 45 to the clutch handle 46. The lower end of clutch handle 46 is free to swing in and out by reason of its being connected to a pintle 47 mounted in a pintle bracket 48, the pintle bracket being rigidly secured to clutch shaft 40. When clutch handle 46 is swung in or out, the cylindrical member 41 is made to shift axially on the shaft 40. When clutch handle 46 is swung about the axis of clutch shaft 40, the shaft is made to rotate in its journals 38 and 39. It is therefore apparent that by means of clutch handle 46 it is possible to axially shift cylindrical member 41 on clutch shaft 40 and also to rotate clutch shaft 40 in its journals. Both of these motions may be imparted at the same time by appropriate manipulation of the handle 46.

The cylindrical member 41 has formed thereon a wedge-shaped spreader 50 which is disposed between the cone-shaped ends 29 of the drums 20 and 20'. As will be seen from Figure 5, the spreader 50 is normally disposed to the side of the conical members 29 and may be rotated by shaft 40 into the space between the conical members, thereby forcing them and the drums 20 and 20' apart. When the drums 20 and 20' are forced apart, their outside discs 52 are moved into frictional engagement with the discs 22 and 22'. Since the drum shaft 18 is normally rotated by the power unit 15 and since the discs 22 and 22' are rigidly fixed on the shaft 18, the spreading of the drums 20 and 20' causes them to be rotated by the power unit 15. It will be noted that by means of connecting rod 43 the spreader 50 may be shifted to engage the conical member 29 of drum 20 or may be shifted in the other direction to engage the conical member 29 of drum 20'. In this way the combined rotation and axial shift of spreader 50 may be employed to cause the rotation of either drum 20 or drum 20'. On the other hand, if the spreader is merely rotated on the shaft 40 and not axially displaced on the shaft, it will act to cause the simultaneous rotation of both drums 20 and 20' at the same rate. It is also possible to achieve rotation of drums 20 and 20' at the same time, but at different rates, by the appropriate manipulation of clutch lever 46.

The shaft 40 also has rigidly secured thereto brake shoes 55 which are so positioned as to engage the peripheral edges of the ends 52 of the drums 20 and 20'. It will be noted by reference to Figure 6 that when the clutch handle 46 is rotated in the counter-clockwise direction, the clutch spreader 50 is rotated out of engagement with the conical members 29 on the drums 20 and 20'; and at the same time the brake shoes 55 are moved into engagement with the peripheral edges of the ends 52 of the drums. It is, therefore, apparent that the handle 46 may be used to stop or retard the rotation of the drums 20 and 20'.

As shown in Figures 1 and 3, a wheeled grass cutter 60 is connected at one side to the cable 30 and connected at the other side to the cable 31. The grass cutter 60 may consist of three conventional grass cutter units arranged side by side with the centrally-located cutter offset from the others. The grass cutter units are rigidly secured together by space bars 61. With this arrangement, it is possible to cut a relatively wide swathe. The three units of the wheeled grass cutter 60 illustrated in Figure 3 are all arranged to cut grass as the cutter is pulled up the hill. An alternative form of the wheeled grass cutter is illustrated in Figure 8 wherein the outside units 63 and 64 are arranged to cut grass as the cutter rolls down hill. The centrally located cutter unit 65 is reversed in position so that it cuts as the grass cutter assembly 60 is drawn up the hill. Covers are provided on the cutters shown in Figure 8.

As is apparent from the drawings, the winch drums 20 and 20' are disposed in the top part of a chamber within the truck 9, leaving a space therebelow for the wheeled grass cutter assembly 60. The side of the chamber may be let down to form a ramp 66 leading to the ground. When put in use, the wheeled grass cutter 60 is allowed to roll down the ramp 66 and continue on down the hill. The direction which the grass cutter 60 takes as it goes down the hill may be controlled by the operator by appropriately manipulating the clutch handle 46. When the spreader 50 is brought to bear more firmly against one of the conical members 29 than the other, the cables 30 and 31 will be allowed to pay out at different rates since ring 32 is rigidly secured to the cable 30 and is merely looped around the cable 31. Any relative difference in the amount of cable payed out from drum 20, as compared with cable payed out from drum 20', will result in a turning of the wheeled grass cutter 60. This effect results from a difference in the length of cable 30 between the cutter 60 and the ring 32 compared with the length of the cable 31 between the wheeled grass cutter 60 and the ring 32. It is, of course, also possible to brake the descent of the grass cutter 60 by means of brake shoes 55 controlled by clutch handle 46.

When the grass cutter 60 has reached the bottom of the slope, the spreader 50 is firmly engaged against the conical members 29 by means of clutch handle 46 with the result that the cables 30 and 31 are wound in on drums 20 and 20'. The drums 20 and 20' will take in the cables at the same rate thereby drawing the grass cutter 60 up the hill, and up the ramp 66 into the truck. The spreader 50 is then disengaged from the conical members 29 and the drive clutch 26 is engaged by means of drive clutch handle 27 until the truck 9 has moved along the crest of the hill by an amount equal to the width of cut of the grass cutter 60. The wheeled grass cutter 60 is then permitted to roll down ramp 66 and on down the hill as previously described. The cycle of operation is repeated until the entire hill is mowed. It will be noted from Figure 4 that ramps 66 are provided on both sides of the truck 9 so that both sides of a hill may be mowed from the crest thereof without turning the truck 9 about.

While I have shown and described preferred forms of my invention, it is to be understood that I am not to be limited thereto and that many changes could be made without departing from the scope of the claims hereto appended.

What I claim is:

1. A mower for use of hills comprising a mobile winch having a power unit, a drum and a cable, a grass cutter connected to the free end of the cable, a ramp on the side of the mobile winch down which the grass cutter may roll on its way down the hill, and a clutch operative to engage the drum with the power unit for drawing the cutter back up the hill and onto the ramp.

2. A mower for use on hills, including a power-operated truck, a winch mounted in the truck and movably engaged with the power means of the latter, a grass cutter carried by the truck, a movable side on the truck operable to provide a ramp for gravitation of the cutter from the truck into engagement with the hill to be mowed, and a cable operatively connected to the winch and engaged with the grass cutter to pull the latter up the hill and ramp and into the truck after the cutter has traveled a predetermined distance.

3. A mower for use on hills comprising a portable housed power plant adapted for positioning on or near the summit of a hill to be mowed, a grass cutter mounted in the power plant housing, a wall of the housing being movable to extend downwardly into engagement with the hill to provide a ramp for the cutter, and a cable a part of which is operatively engaged with the power plant and another part connected to the cutter for pulling the latter up the hill and into the power plant after the cutter has traveled a predetermined distance down the hill.

JOHN J. EBENHOE.

REFERENCES CITED

The following references are of record in the file of this patent:

UNITED STATES PATENTS

| Number | Name | Date |
|---|---|---|
| 1,386,979 | Wickersham | Aug. 9, 1921 |
| 1,562,709 | McNutt | Nov. 24, 1925 |
| 1,624,285 | Siders | Apr. 12, 1927 |
| 2,050,133 | Smith | Aug. 4, 1936 |
| 2,084,449 | Neese | June 22, 1937 |
| 2,191,426 | Clapper | Feb. 20, 1940 |

FOREIGN PATENTS

| Number | Country | Date |
|---|---|---|
| 15,257 | Great Britain | Aug. 11, 1904 |